United States Patent
Woodley et al.

(10) Patent No.: US 11,251,741 B2
(45) Date of Patent: Feb. 15, 2022

(54) MODULAR BOARD-LEVEL MOTOR CONTROL SYSTEM WITH INTEGRATED PROTECTION AND CONTROL COMPONENTS

(71) Applicant: Eaton Intelligent Power Limited, Dublin (IE)

(72) Inventors: Kaijam M. Woodley, Brown Deer, WI (US); Joseph Paul Uphaus, Whitefish Bay, WI (US); Tua Xiong, Milwaukee, WI (US); Andrew D. Delimat, Burlington, WI (US)

(73) Assignee: Eaton Intelligent Power Limited, Dublin (IE)

( * ) Notice: Subject to any disclaimer, the term of this patent is extended or adjusted under 35 U.S.C. 154(b) by 62 days.

(21) Appl. No.: 16/678,252

(22) Filed: Nov. 8, 2019

(65) Prior Publication Data

US 2020/0162012 A1    May 21, 2020

Related U.S. Application Data

(60) Provisional application No. 62/767,577, filed on Nov. 15, 2018.

(51) Int. Cl.
  *H05K 7/14*     (2006.01)
  *H02P 29/032*   (2016.01)
  *H02P 29/50*    (2016.01)

(52) U.S. Cl.
  CPC ............ *H02P 29/032* (2016.02); *H02P 29/50* (2016.02)

(58) Field of Classification Search
  CPC ...... H02P 29/032; H02P 29/50; H05K 7/1432
  See application file for complete search history.

(56) References Cited

U.S. PATENT DOCUMENTS

| 4,356,525 A | 10/1982 | Komrumpf et al. |
| 5,327,064 A * | 7/1994 | Arakawa ................ H02P 6/085 |
| | | 318/801 |

(Continued)

OTHER PUBLICATIONS

Mallinson, "Plug and play" single chip controllers for variable speed induction motor drives in white goods and HVAC systems, Thirteenth Annual Applied Power Electronics Conference and Exposition, Feb. 19, 1998, vol. 2, pp. 756-762 (Year: 1998).*

(Continued)

*Primary Examiner* — Cortez M Cook
(74) *Attorney, Agent, or Firm* — DiBerardino McGovern IP Group LLC

(57) ABSTRACT

A motor control system for selectively controlling power from a power source to a load includes a PCB structure and a power converter affixed to the PCB structure that is operable to provide a controlled output power to the load. The motor control system also includes a standalone protection and control module mounted onto the at least one PCB structure so as to be electrically coupled therewith, the standalone protection and control module further including a front-end switching unit comprising a plurality of switching devices operable to selectively interrupt and control power flow from the power source to the power converter and to a bypass path that bypasses the power converter and a back-end switching unit positioned downstream from the front-end switching unit and comprising a plurality of switching devices operable to selectively interrupt power flow from the power converter and the bypass path to the load.

25 Claims, 6 Drawing Sheets

(56) References Cited

U.S. PATENT DOCUMENTS

| | | |
|---|---|---|
| 5,824,990 A | 10/1998 | Geissler et al. |
| 5,894,415 A | 4/1999 | Habegger |
| 6,163,129 A | 12/2000 | Younger et al. |
| 6,356,044 B1 | 3/2002 | Archer |
| 7,224,557 B2 | 5/2007 | Kinsella et al. |
| 7,719,219 B2 | 5/2010 | Baumann et al. |
| 7,940,018 B2 | 5/2011 | Yonemori et al. |
| 8,014,110 B2 | 9/2011 | Schnetzka et al. |
| 8,228,019 B2 | 7/2012 | Higuchi et al. |
| 8,693,170 B2 | 4/2014 | Barreau et al. |
| 9,018,882 B2 | 4/2015 | Mack et al. |
| 9,641,095 B1 | 5/2017 | Wild et al. |
| 2004/0113594 A1 | 6/2004 | Athari et al. |
| 2004/0222035 A1* | 11/2004 | Yoneda .................. B62D 5/046 180/443 |
| 2004/0262997 A1 | 12/2004 | Gull et al. |
| 2005/0189889 A1* | 9/2005 | Wirtz .................. H05K 7/1432 318/105 |
| 2008/0094771 A1 | 4/2008 | Messersmith et al. |
| 2008/0103632 A1 | 5/2008 | Saban et al. |
| 2008/0136259 A1 | 6/2008 | Coffey et al. |
| 2012/0098261 A1 | 4/2012 | Rozman et al. |
| 2013/0076126 A1 | 3/2013 | Hashimoto |
| 2013/0235494 A1 | 9/2013 | Holce et al. |
| 2013/0299271 A1 | 11/2013 | Endo et al. |
| 2013/0307355 A1 | 11/2013 | Sakamaki |
| 2014/0043732 A1 | 2/2014 | McKay et al. |
| 2014/0307367 A1 | 10/2014 | Maeda et al. |
| 2015/0035286 A1 | 2/2015 | Stephens |
| 2015/0162864 A1 | 6/2015 | Moghadas et al. |
| 2015/0171733 A1 | 6/2015 | Zargari et al. |
| 2015/0283911 A1 | 10/2015 | Ambrosio |
| 2016/0043670 A1 | 2/2016 | Nakamura et al. |
| 2016/0156278 A1 | 6/2016 | Ramm et al. |
| 2016/0242313 A1 | 8/2016 | Singh et al. |
| 2016/0268797 A1 | 9/2016 | Li et al. |
| 2016/0373017 A1 | 12/2016 | Mima et al. |
| 2017/0110991 A1 | 4/2017 | Frampton et al. |
| 2018/0034403 A1 | 2/2018 | Kim et al. |
| 2018/0076745 A1 | 3/2018 | Cox |
| 2018/0167002 A1 | 6/2018 | Frampton et al. |
| 2018/0178830 A1 | 6/2018 | Koseki et al. |

OTHER PUBLICATIONS

"PowerGate 'H' HVAC Bypass Controller," Mitsubishi Electric Corporation, Feb. 2, 2017, pp. 1-2, https://us.mitsubishielectric.com/fa/en/solutions/industries/hvac/powergatehseries.

* cited by examiner

MODULAR BOARD-LEVEL MOTOR CONTROL SYSTEM WITH INTEGRATED PROTECTION AND CONTROL COMPONENTS

CROSS-REFERENCE TO RELATED APPLICATIONS

The present invention claims priority to U.S. Provisional Patent Application Ser. No. 62/767,577 filed Nov. 15, 2018, the disclosure of which is incorporated herein by reference in its entirety.

BACKGROUND OF THE INVENTION

Embodiments of the invention relate generally to motor control systems and, more particularly, to a board-level motor control system having integrated protection and control components.

One type of system commonly used in industry that performs power conversion is an adjustable speed drive, also known as a variable frequency drive (VFD). A VFD is an industrial control device that provides for variable frequency, variable voltage operation of a driven system, such as an AC induction motor. In use, a VFD is often provided as part of a motor control system and overall control and protection assembly that includes the VFD as well as an arrangement of input/output fuses, disconnects, circuit breakers or other protection devices, controllers, filters, sensors, and a bypass assembly that includes one or more of a bypass contactor and soft starter that provide alternate control paths or mechanisms for controlling the driven system.

As a general rule in known motor control systems, the VFD and associated protection and control devices are provided as discrete components having their own housings. The discrete, housed components are positioned within a large metal enclosure and are fixed to a support within the enclosure, such as a DIN rail for example, with wiring being provided between the components to provide for electrical connectivity and/or communication therebetween. When the overall collection of components is assembled as a unit, the enclosure required to house the components becomes quite large and bulky. Also, the large amount of wiring required between the components can hinder accessibility to the components, increases installation time and the potential for failure due to wiring and wiring connections, and reduces the overall efficiency of the motor control system.

It would therefore be desirable to provide a motor control system with a minimized footprint, reduced component count, increased efficiency, and improved operational flexibility.

BRIEF DESCRIPTION OF THE INVENTION

In accordance with one aspect of the invention, a motor control system for selectively controlling power from a power source to a load includes at least one printed circuit board (PCB) structure and a power converter affixed to the at least one PCB structure so as to be electrically coupled therewith, the power converter operable to provide a controlled output power to the load. The motor control system also includes a standalone protection and control module mounted onto the at least one PCB structure so as to be electrically coupled therewith, the standalone protection and control module further including a front-end switching unit comprising a plurality of switching devices operable to selectively interrupt and control power flow from the power source to the power converter and to a bypass path that bypasses the power converter and a back-end switching unit positioned downstream from the front-end switching unit and comprising a plurality of switching devices operable to selectively interrupt power flow from the power converter and the bypass path to the load.

In accordance with another aspect of the invention, a standalone board-level protection and control device operable with a power converter to provide a motor control system that selectively controls power from a power source to a load is provided. The board-level protection and control device includes a bypass path, a front-end switching unit positioned at a first end of the bypass path that receives power from the power source, and a back-end switching unit positioned downstream from the front-end switching unit at a second end of the bypass path. The front-end switching unit comprises a plurality of switching devices operable to selectively control power flow from the power source to the power converter and to the bypass path. The back-end switching unit comprises a plurality of switching devices operable to selectively control power flow from the power converter and the bypass path to the load. The front-end switching unit, the back-end switching unit, and the bypass path provide bypass functionality and short circuit protection to the power converter when operated therewith.

Various other features and advantages of the present invention will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION

Embodiments of the invention relate to a modular board-level motor control system and to a standalone board level protection and control module thereof that includes an arrangement of semiconductor switches and relays/contacts that provide isolation and bypass functionality in the motor control system. The standalone board level protection and control module is provided as a plug-and-play module that can be coupled with a power converter (e.g., VFD unit) at the board level to offer a motor control system with bypass functionality and short circuit protection within a singular enclosure package. The standalone board-level protection and control module incorporates all the functionality of a plurality of protection and control devices that are typically provided as independent components in a motor control system—such as separate input/output contactors, circuit breakers or other protection devices, and a bypass assembly that includes one or more of a bypass contactor and soft starter that provide alternate control paths or mechanisms for controlling the driven system, along with associated power supply, current sensing, and control devices.

While embodiments of the invention are described and illustrated herebelow as being directed to a motor control system, it is recognized that embodiments of the invention are not meant to be limited to such circuits. That is, embodiments of the invention may be extended more generally to power/energy conversion circuits of varying constructions and implementations, including motor starters, motor control centers, and power/energy conversion circuits for driving non-motor loads, for example. Accordingly, the following discussion of a board-level motor control system is not meant to limit the scope of the invention.

Figure 1:
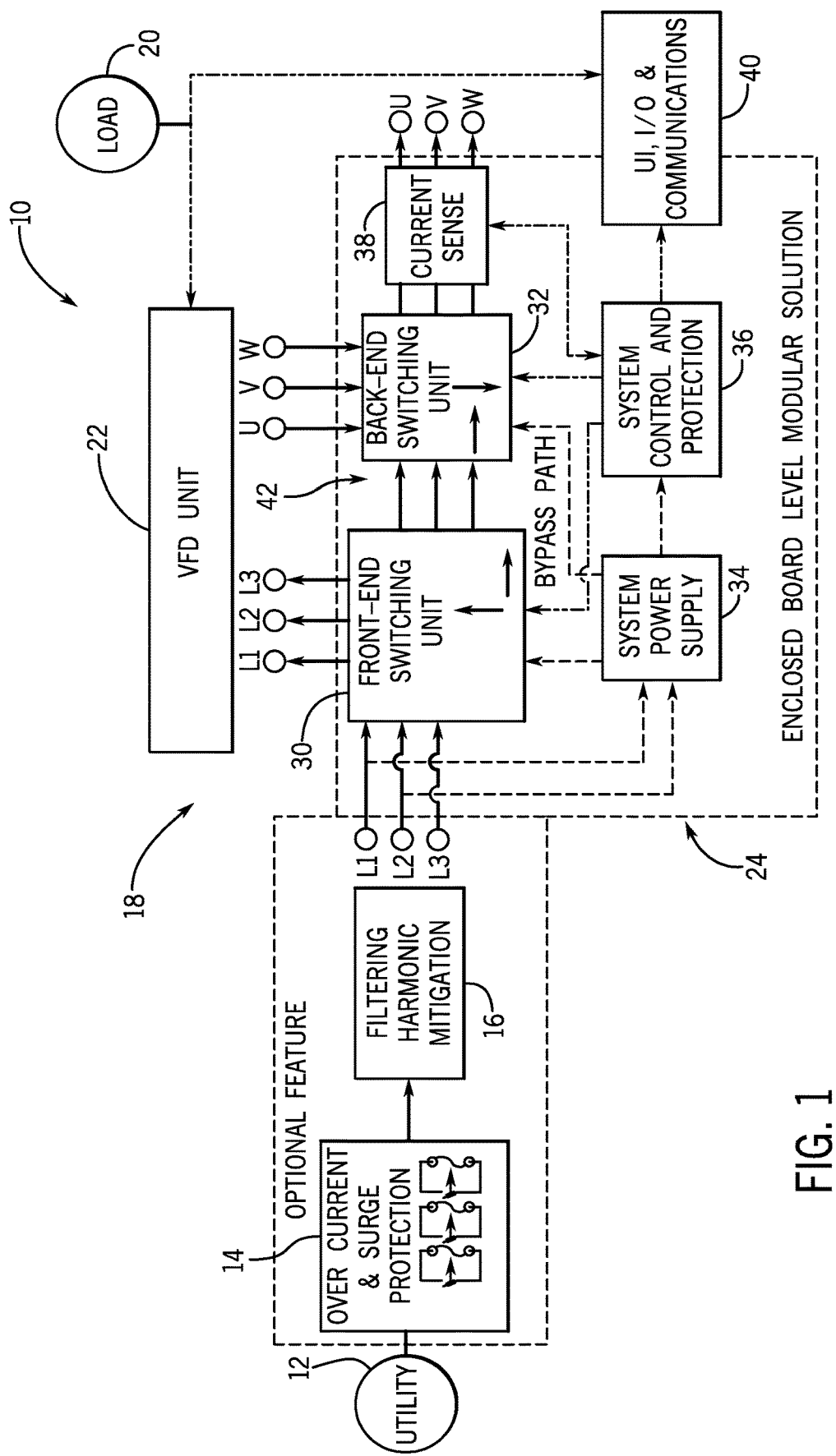
FIG. 1 is a block diagram of a board-level motor control system, according to an embodiment of the invention.

Referring to FIG. 1, a block schematic of a power system 10 is shown. Power system 10 includes a power source 12, such as from a utility, for example, coupled to an over current and surge protection device 14. According to various embodiments, the over current and surge protection device 14 may include one or more of a disconnect contactor or switch that may be operated in a closed/On position in which power from utility 12 is allowed to flow therethrough and an open/Off position in which power may not flow therethrough, and/or an input fuse that provides overcurrent protection by interrupting the current from utility 12 if the level of current becomes too high. One or more of input and EMI filters 16 may also be included in power system 10 that function to provide filtering harmonic mitigation of the input power provided by power source 12.

Figure 2:
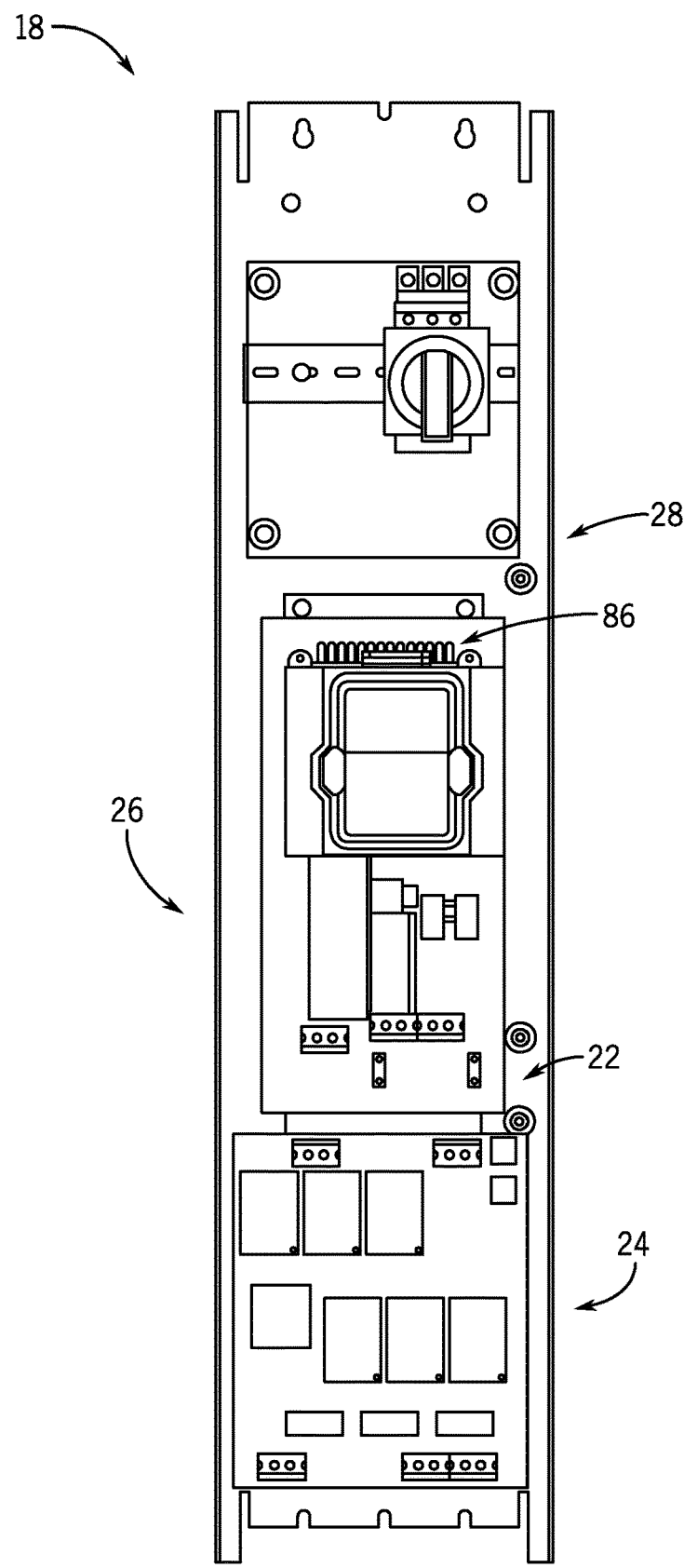
FIG. 2 is a front view of the board-level motor control system of FIG. 1, according to an embodiment of the invention.

As shown in FIG. 1, power system 10 further includes a motor control system 18 that drives and helps protect a motor or other load 20. Motor control system 18 includes a power converter 22 and a standalone protection and control module 24 separate from the power converter 22. According to embodiments of the invention, and as best shown in FIG. 2, the motor control system 18 is provided as a board-level circuit, with the power converter 22 and protection and control module 24 mounted to a printed circuit board (PCB) 26. The PCB 26 may be provided as a single board or as a modular board (i.e., two or more distinct PCBs) and may have a standard or customized construction. The PCB 26 may include an insulating substrate 28 with a plurality of traces or leads (not shown) formed thereon that provide electrical connection paths on the substrate between components/modules connected to the PCB 26. The mounting of power convertor 22 and protection and control module 24 directly to PCB 26 results in a board-level motor control system 18 having fewer terminal connections and cables, such that voltage losses in the motor control system 18 are reduced and efficiency of the system is improved.

According to one embodiment of motor control system 18, power converter 22 is in the form of a VFD unit (hereafter "VFD unit 22") that provides for driving and adjusting the operating speed of motor 20. VFD unit 22 may be of known construction and operate to rectify an AC input power into a DC power and subsequently invert the DC power to a desired three-phase, three-line AC power that is provided to the motor 20. The VFD unit 22 may be affixed to or removably mounted on the PCB 26, either via a solder connection to the PCB 26 or via a plug-and-play type connection thereto.

Figure 3:
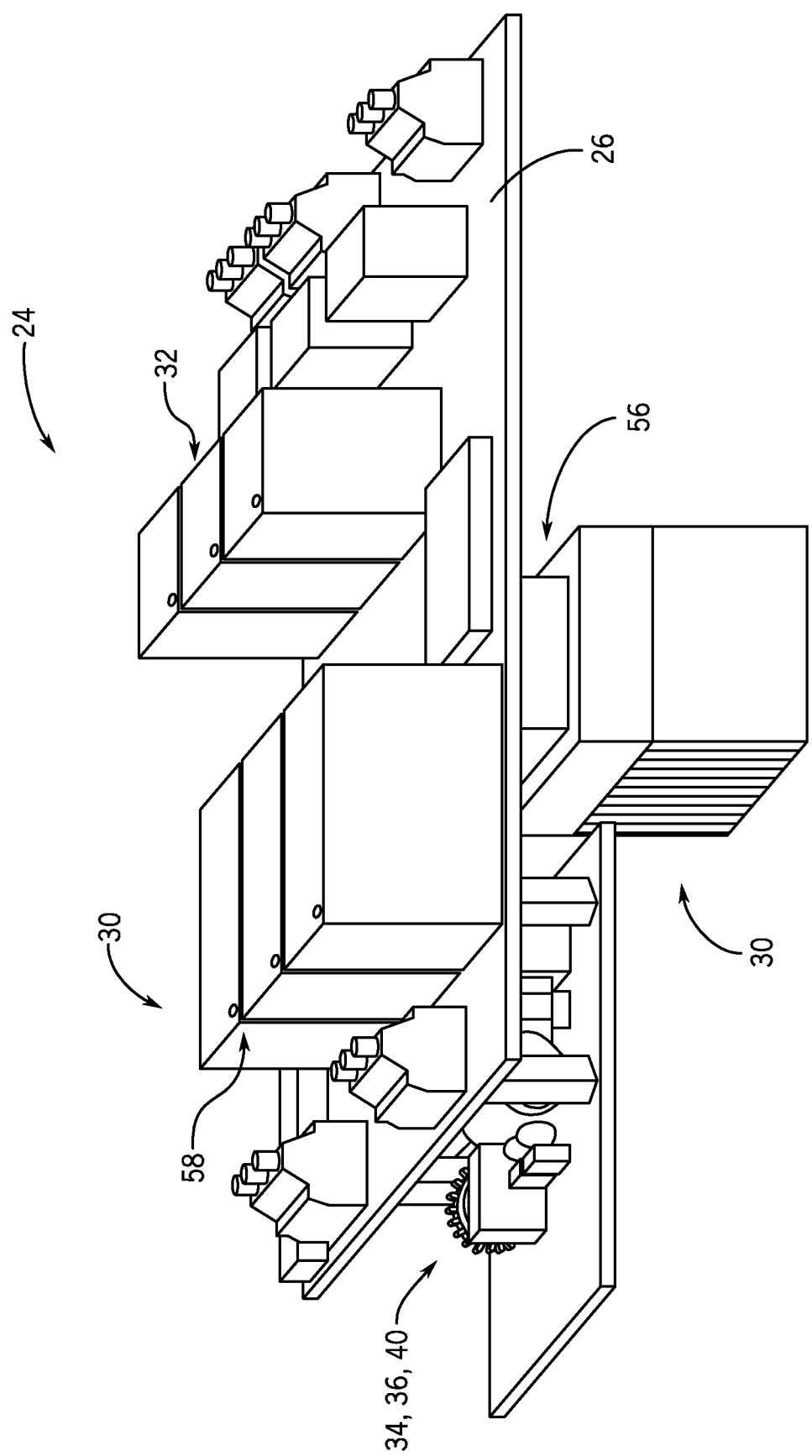
FIG. 3 is a perspective view of a standalone protection and control module included in the motor control system of FIGS. 1 and 2, according to an embodiment of the invention.

According to an embodiment of the invention, and as shown in FIG. 1 and now also in FIG. 3, the protection and control module 24 is generally comprised of a front-end switching unit 30, a back-end switching unit 32, a system power supply 34, a system controller 36, sensing devices/circuits 38, and module input/output (I/O) and communications interface 40. The protection and control module 24 is provided as a standalone board level module that may be selectively mounted on the PCB 26, with the module I/O and communications interface 40 being in the form of a plug-and-play type connection that provides for attachment of the protection and control module 24 to the PCB 26 and for communication between the protection and control module 24 and other components in motor control system 18. Protection and control module 24 may thus be provided with module I/O and communications interface 40 constructed as a slot and/or pin type plug-and-play type attachment that snaps onto or interfits with mating plug-and-play type receptacles (not shown) mounted on the PCB 26. In one embodiment, the protection and control module 24 may communicate with power converter 22 via connection of module I/O and communications interface 40 to the PCB 26, with traces or leads on the PCB then providing electrical connection paths to the power converter 22. In another embodiment, module I/O and communications interface 40 may provide for wireless communication between protection and control module 24 and power converter 22.

In operation of motor control system 18, controller 36 may selectively operate the protection and control module 24 in what is termed herein as a VFD mode (i.e., power conversion mode) or a bypass mode of operation, with power being provided to motor 20 through VFD unit 22 in the VFD mode of operation and power being provided to motor 20 through a bypass path 42 (with VFD unit 22 disconnected) provided by protection and control module 24 in the bypass mode of operation. In the case of an inverter fault, over temperature fault, or other error in the VFD unit 22, motor operation can be automatically transferred to the bypass path 42 to continue operation of the motor 20, maintain drive life, and for other benefits. The controller 36 may also determine to transfer motor operation to the bypass path 42 when it is desired to operate the motor 20 in a steady-state condition (e.g., full speed) that does not require power conditioning by the VFD unit 22, such that bypassing thereof might be beneficially employed to reduce switching losses, etc. In determining a desired mode of operation, it is recognized that controller 36 may receive inputs from module I/O and communications interface 40 and/or sensing devices/circuits 38 that are operably connected thereto. For example, controller 36 may communicate with the VFD unit 22 through communication protocols using configurable lite logic, so as to allow the VFD unit 22 to receive input from the protection and control module 24 and vice versa. System power supply 34 provides for transitioning between the VFD and bypass modes of operation by powering switching in the protection and control module 24, with the system power supply 34 powering the protection and control module 24 from the three-phase line input. Additionally, the system power supply 34 may provide power to the VFD unit 22 to provide for operation thereof (i.e., controlling of switches therein).

With regard to the power system 10 illustrated in FIG. 1, it is noted that while the over current and surge protection device 14 and filter(s) 16 are shown as being separate from protection and control module 24, it is to be understood that the over current and surge protection device 14 and filter(s) 16 (or components thereof) could be incorporated into protection and control module 24, according to an embodiment of the invention. That is, the surge protection device 14 (e.g., input fuses thereof) and filter(s) 16 could be packaged within the standalone protection and control module 24 along with front-end switching unit 30, back-end switching unit 32, system power supply 34, system controller 36, sensing devices/circuits 38, and module I/O and communications interface 40. Such inclusion of surge protection device(s) 14 and filter(s) 16 could further reduce the number of discrete components that would need to be mounted to PCB 26.

Figure 4:
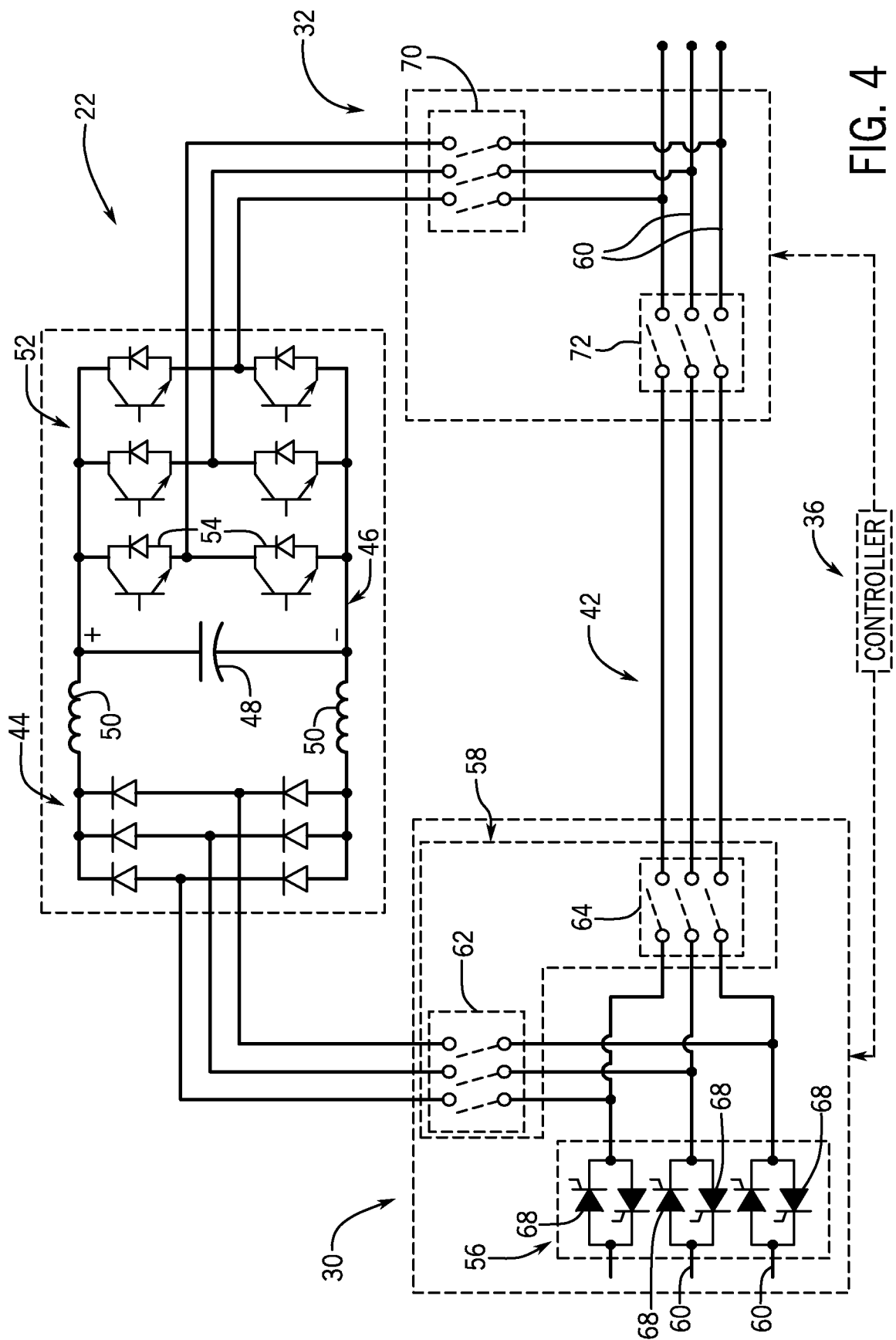
FIG. 4 is a schematic diagram of the standalone protection and control module of FIG. 3, according to an embodiment of the invention.

Referring now to FIG. 4, a schematic diagram of parts of motor control system 18 is illustrated in order to better describe operation of protection and control module 24 and VFD unit 22 during the VFD mode and bypass mode of operation. As previously indicated, VFD unit 22 may be of a known construction that may generally include: a rectifier bridge 44 that converts an AC input power into a DC power, a DC link 46 that receives the DC power from the rectifier bridge, a DC link capacitor bank 48 across DC link, and optional inductors 50 coupled in series with and on either side of the rectifier bridge 44 on DC link 46 (i.e., a DC choke). The VFD unit 22 may also include an inverter 52 to convert the DC power to AC power—with the inverter 52 being comprised of a plurality of solid-state switches 54 (e.g., IGBTs) that may be selectively controlled to output a desired three-phase, three-line power from the VFD unit 22 and to the motor 20. While not shown in FIG. 3, it is recognized that input and EMI filters may be provided with VFD unit 22. The three-phase power output by VFD unit 22 may be regulated/controlled by controller 36 via the transmission of gate drive signals to the inverter switches 54 to control opening and closing thereof, thereby controlling the current flow (and therefore the voltage) applied to the motor 20.

Figure 5:
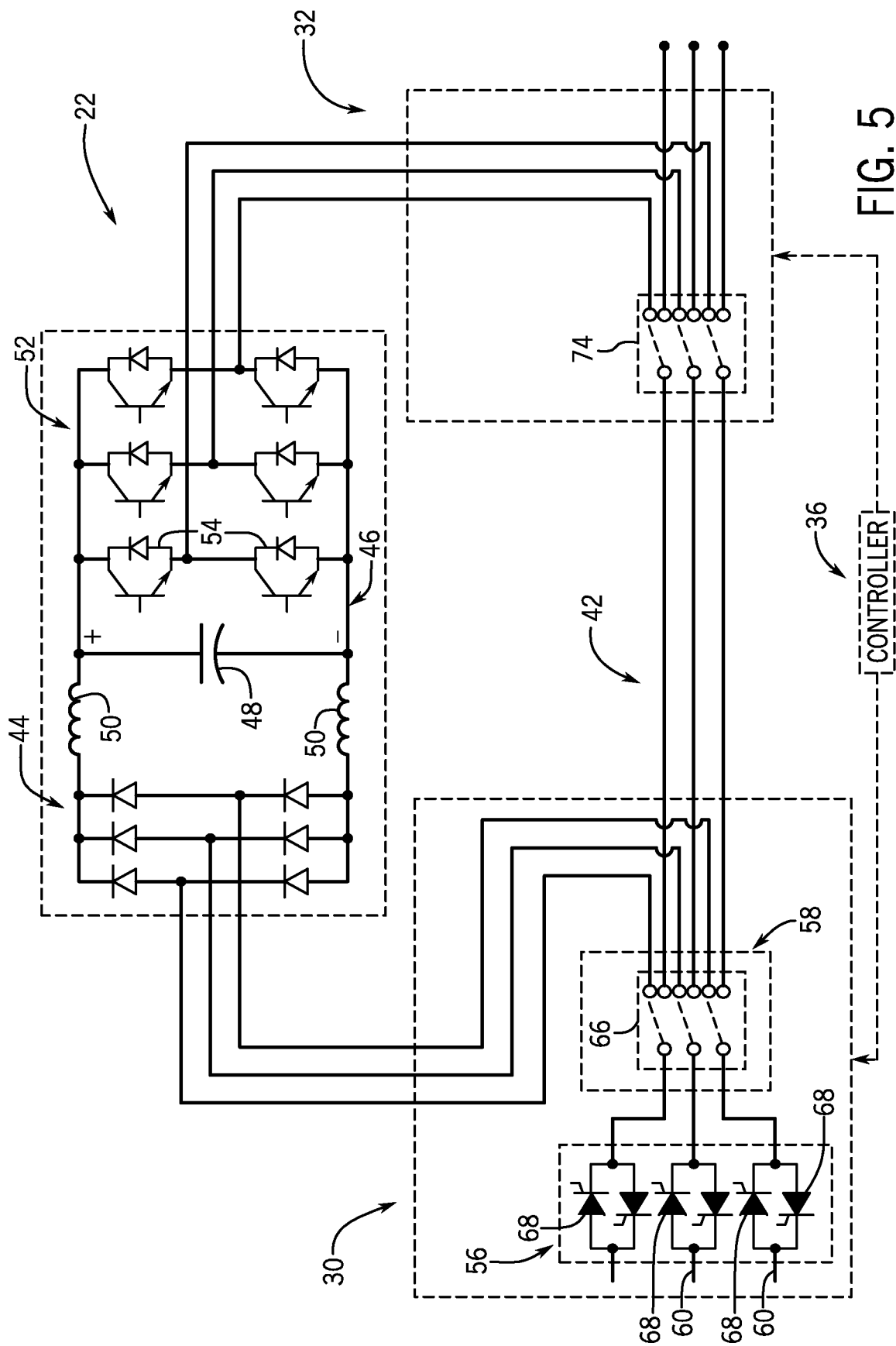
FIG. 5 is a schematic diagram of the standalone protection and control module of FIG. 3, according to another embodiment of the invention.

As further shown in FIG. 4, the front-end switching unit 30 includes a solid-state switching device 56 and an electromechanical switching device 58. The electromechanical switching device 58 includes one or more isolation relays/contactors on each phase 60 that may be operated selectively to conduct and block current therethrough. According to one embodiment, a pair of isolation relays/contactors 62, 64 may be provided on each phase 60, with a first isolation relay/contactor 62 being selectively controlled between an Off/open position that blocks current therethrough and an On/closed position that conducts current therethrough and directs the current to the VFD unit 22, and with a second isolation relay/contactor 64 being selectively controlled between an Off/open position that blocks current therethrough and an On/closed position that conducts current therethrough and directs the current to the bypass path 42. Alternatively, and as shown in FIG. 5, an isolation relay/contactor may be provided on each phase 60 that is constructed as a single throw double pole (SPDT) relay/contactor 66 that has an Off/open position that blocks current therethrough, a first On/closed position that conducts current therethrough and directs the current to the VFD unit 22, and a second On/closed position that conducts current therethrough and directs the current to the bypass path 42.

Referring again to FIG. 4, the solid-state switching device 56 includes a pair of anti-parallel solid-state switches 68 on each phase 60 that control the current flow through solid-state switching device 56 and provide for a "soft-starter" functionality. According to embodiments of the invention, the solid-state switches 68 may be in the form of silicon controlled rectifiers (SCRs) or thyristors, IGBTs, or MOSFETs, for example, and may be composed of Si, SiC, GaN, or another suitable wide bandgap material. The solid-state switches 68 may be operated in an On/closed state to conduct current therethrough, an Off/open state to block current therethrough, or selectively switched On/Off to control transmission of voltage and current therethrough and thereby limit the transient voltages and current to the motor 20—allowing for a soft ramp-up of the motor 20. When operated in the Off/open state, solid-state switches 68 provide for solid-state switching device 56 to be operated as an overload relay based on overvoltage and/or overcurrent conditions present in power system 10 (FIG. 1).

The back-end switching device 32 is positioned downstream from the front-end switching unit 30 on the opposite end of bypass path 42 and includes one or more isolation relays/contactors on each phase 60 that may be operated selectively to conduct and block current therethrough in order to control power provided to the load 20, i.e., to isolate the load 20 from the VFD unit 22 when the power system 10 is operating in bypass mode or connect the VFD unit 22 and load 20 when the power system 10 is operating in the VFD mode. According to one embodiment, a pair of load isolation relays/contactors 70, 72 may be provided on each phase 60, with a first load isolation relay/contactor 70 on each phase being selectively controlled between an Off/open position that blocks current therethrough and an On/closed position that conducts current therethrough that is output from the VFD unit 22, and with a second load isolation relay/contactor 72 on each phase being selectively controlled between an Off/open position that blocks current therethrough and an On/closed position that conducts current therethrough that is flowing on the bypass path 42. Alternatively, and as shown in FIG. 5, a load isolation relay/contactor may be provided on each phase 60 that is constructed as a SPDT relay/contactor 74 that has an Off/open position that blocks current therethrough, a first On/closed position that conducts current therethrough that is output from the VFD unit 22, and a second On/closed position that conducts current therethrough that is flowing from the bypass path 42.

In controlling operation of protection and control module 24 in the VFD mode and bypass mode of operation, controller 36 controls operation of front-end switching unit 30 and back-end switching unit 32 via the opening and closing of mechanical relays/contacts and/or solid-state switches thereof, such as via the transmission of control signals or gate drive signals thereto. By controlling opening and closing of switches in front-end switching unit 30 and back-end switching unit 32, current through the VFD unit 22 can be selectively controlled.

For the protection and control module 24 illustrated in FIG. 4, to operate in VFD mode and provide for current flow through VFD unit 22, the first isolation relays/contactors 62 are moved to the On/closed position to direct current to the VFD unit 22 and the second isolation relays/contactors 64 are moved to the Off/open position to not allow current flow on the bypass path 42, while the first load isolation relays/contactors 70 are moved to the On/closed position to conduct current therethrough that is output from the VFD unit 22 and the second load isolation relays/contactors 72 are moved to the Off/open position to block current flow on the bypass path 42. Additionally, in the VFD mode, the switches 68 of solid-state switching device 56 are controlled to ramp-up voltage prior to power flowing to VFD unit 22.

For the protection and control module 24 illustrated in FIG. 5, to operate in VFD mode and provide for current flow through VFD unit 22, the SPDT isolation relays/contactors 66 are moved to the first On/closed position to direct the current to the VFD unit 22 and not allow current flow on the bypass path 42, while the SPDT load isolation relays/contactors 74 are moved to the first On/closed position to conduct current therethrough that is output from the VFD unit 22 and block current flow from the bypass path 42. Additionally, in the VFD mode, the switches 68 of solid-state switching device 56 are controlled to ramp-up voltage prior to power flowing to VFD unit 22.

For the protection and control module 24 illustrated in FIG. 4, to operate in bypass mode and cut-off current flow through VFD unit 22, the first isolation relays/contactors 62 are moved to the Off/open position to cut-off current to the VFD unit 22 and the second isolation relays/contactors 64 are moved to the On/closed position to direct current flow onto the bypass path 42, while the first load isolation relays/contactors 70 are moved to the Off/open position to cut-off/isolate the VFD unit 22 and the second load isolation relays/contactors 72 are moved to the On/closed position to provide for current flow therethrough from the bypass path 42. Additionally, in the bypass mode, the solid-state switches 68 of solid-state switching device 56 are controlled to be initially taken offline (i.e., non-conducting) prior to changing the state/position of the isolation relays/contactors 62, 64 and the load isolation relays/contactors 70, 72 and then subsequently controlled to provide a controlled power output from solid-state switching device 56 to enable a ramping or soft-starting of motor 20.

For the protection and control module 24 illustrated in FIG. 5, to operate in bypass mode and cut-off current flow through VFD unit 22, the SPDT isolation relays/contactors 66 are moved to the second On/closed position to direct the current to the bypass path 42 and not allow current flow through VFD unit 22 2, while the SPDT load isolation relays/contactors 74 are moved to the second On/closed position to conduct current therethrough from the bypass path 42 and block current flow from the VFD unit 22. Additionally, in the bypass mode, the solid-state switches 68 of solid-state switching device 56 are controlled to be initially taken offline (i.e., non-conducting) prior to changing the state/position of the SPDT isolation relays/contactors 66 and the SPDT load isolation relays/contactors 74 and then subsequently controlled to provide a controlled power output from solid-state switching device 56 to enable a ramping or soft-starting of motor 20.

In switching between the VFD mode and bypass mode of operation, it is recognized that positioning of solid-state switching device 56 upstream from electromechanical switching device 58 and from where input power is directed to either the bypass path 42 or to VFD unit 22 (based on controlling of the electromechanical switching device 58) allows for isolation relays/contactors 62, 64, 66 to be provided as lower rating relays/contactors. The positioning of solid-state switching device 56 at a location upstream from electromechanical switching device 58 allows for switching of the isolation relays/contactors 62, 64, 66 at a zero-load condition, as the solid-state switches 68 may be switched to an Off/non-conducting state for a period during which the isolation relays/contactors 62, 64, 66 are switched. Accordingly, the isolation relays/contactors 62, 64, 66 may be in the form of lower rated relays having a voltage rating that is less than a full motor voltage of motor 20 and less than inrush current ratings.

According to embodiments of the invention, the controller 36 may make a determination of whether to operate the protection and control module 24 in the VFD mode or the bypass mode of operation based on a number of inputs and/or measured parameters. In one embodiment, the controller 36 may make the determination of whether to protection and control module 24 in VFD mode or bypass mode based upon one or more inputs by an operator (received via module I/O and communications interface 40 or via a user interface on the motor control system 18, for example) indicating that the motor 20 is to be operated in a steady-state condition (e.g., at full speed) that does not require power conditioning by the VFD unit 22, such that bypassing thereof might be beneficially employed (e.g., to reduce switching losses). In another embodiment, the controller 36 may make this determination based upon detection that the VFD unit 22 has experienced a fault condition or is otherwise not functioning properly, with the controller 36 communicating with the VFD unit 22 through communication protocols using configurable lite logic, so as to allow the protection and control module 24 to receive input from the VFD unit 22, and vice versa. That is, controller 36 may compare one or more voltage and/or current values measured in the VFD unit 22, as inputs to the VFD unit, or as outputs from the VFD unit, to one or more pre-defined thresholds in order to sense a short circuit or other fault condition in the motor control system 18. For example, one or more voltage or current sensing devices/circuits—which may be sensing devices/circuits 38 or other sensing devices/circuits—may operate to measure one or more of the following voltage/current parameters in the motor control system 18, including: three phase input currents or voltages to the VFD unit 22, current at the switch level of rectifier 44 or inverter 52 and/or on DC link 46 in the VFD unit 22, and/or load output currents or voltages from the VFD unit 22, for example. As one example, the controller 36 compares the DC link voltage to a pre-defined "Overvoltage Condition" to determine if the VFD unit 22 has malfunctioned.

Beneficially, the integration of the protection and control module 24 onto PCB 26 at a board-level and the operability and control of the protection and control module 24 by controller 36 allows for simplification of the motor control system 18. That is, configuring of protection and control module 24 as a standalone module that can be coupled with VFD unit 22 on PCB 26 to offer a motor control system 18 with bypass functionality and short circuit protection within a singular package eliminates the need for multiple distinct components to be coupled to the PCB 26. The protection and control module 24 incorporates all the functionality of a plurality of protection and control devices that are typically provided as independent components in a motor control system—such as separate input/output contactors, circuit breakers or other protection devices, and a bypass assembly that includes one or more of a bypass contactor and soft starter that provide alternate control paths or mechanisms for controlling the driven system, along with associated power supply, current sensing, and control devices. Additionally, integration of the protection and control module 24 onto PCB 26 at the board-level allows for a single controller or central processor to control operation of protection and control module 24 and VFD unit 22 based on inputs or sensed parameters provided to controller 36, as described above. The board-level construction of motor control system 18 and its singular controller 36 eliminates need for multiple discrete control circuits or processors (e.g., overload processor and bypass processor) and/or a micro-programmable multi-processor (MMP) of prior art topologies. All sensor hardware, functions, and digital signal processing may be built into the board-level motor control system 18, making an overload relay and associated sensors and processors unnecessary (i.e., a common current sense functionality for motor overload in system 18). In addition, construction of motor control system 18 as a board-level circuit provides advantages regarding power supply and thermal management. As one example, the board-level motor control system 18 may derive control powers from input power provided by utility source 12 (FIG. 1), via system power supply 34, as compared to typical motor control system designs/products where a standalone, commercially available power supply is required to provide control power.

Figure 6:
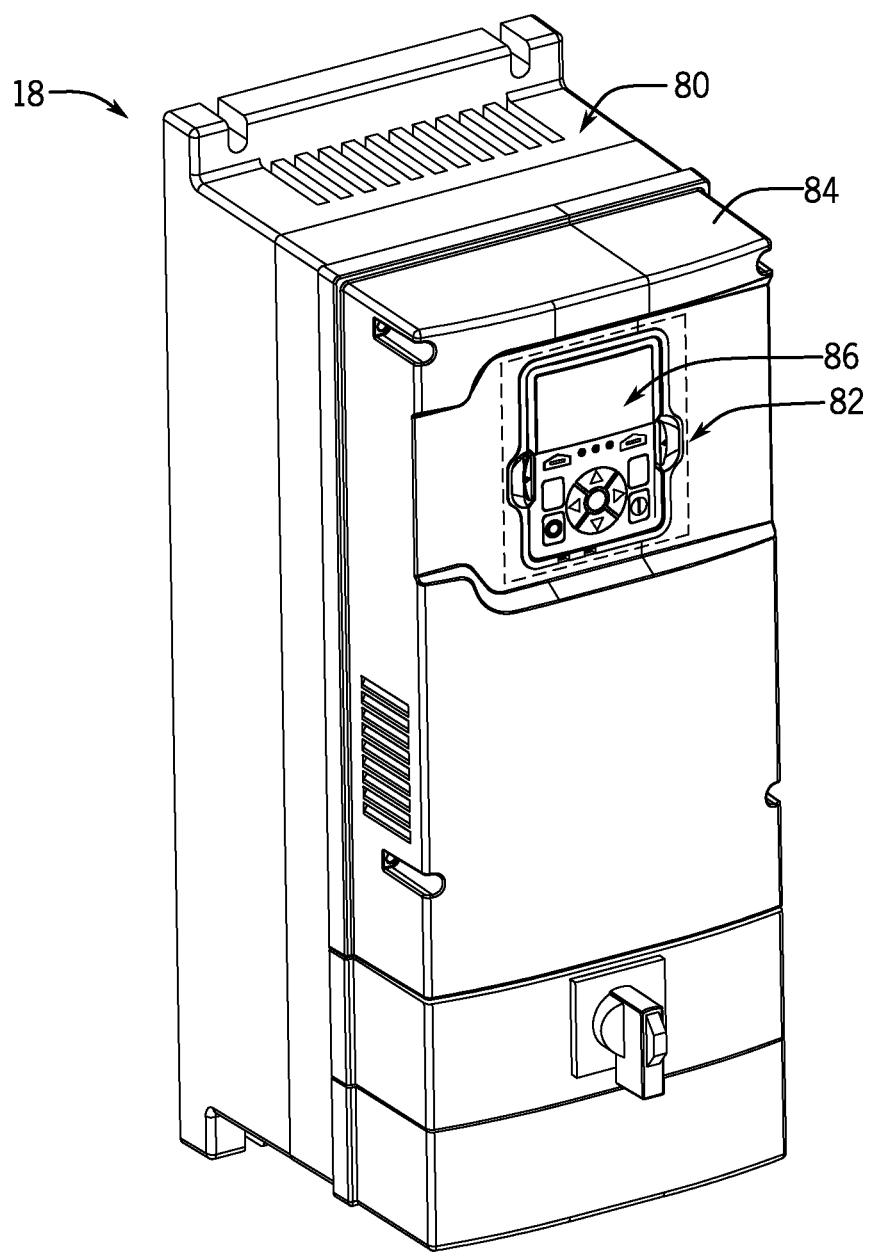
FIG. 6 is a perspective view of a compact housing enclosing the motor control system of FIGS. 1 and 2, according to an embodiment of the invention.

Referring now to FIG. 6, it is seen that motor control system 18 is housed within a compact housing 80 that provides protection for the components and meets environmental ratings standards (i.e., ingress protection standards) for the overall motor control system 18. Housing 80 is constructed from an electrically non-conductive material such as, for example, plastic. The size of the housing 80 is greatly reduced as compared to a standard large metal enclosure that encloses a motor drive system having discrete protection and control devices (each with its own housing and being connected via cabling). For example, the compact plastic housing 80 of motor control system 18 may have dimensions of 20.5"×8"×10.25", as compared to a standard large metal enclosure having dimensions of 36"×20.5"×12.00".

According to one embodiment, housing 80 may be formed with an opening 82 in a front door 84 thereof to accommodate a human-machine interface (HMI) or control panel 86 of the motor control system 18. As shown in FIGS. 2 and 6, the control panel 86 is mounted directly to PCB 26 and may extend out therefrom to fit within opening 82, so as to be accessible by a user even when front door 84 is closed. The control panel 86 may facilitate installation, operation, maintenance, or other interactions with the motor control system 18. The control panel 86 includes a user interface that may include hands-off-auto selector buttons, a touch screen LCD display, a jumper/selector switch, indicator lights, and/or connection ports or I/Os for connecting external electronic devices (e.g., laptop or other mobile computing and networking devices) for fast setup or remote monitoring purposes (i.e., receiving outputs from motor control system 18), to name but a few non-limiting examples. Of course, those skilled in the relevant art will appreciate that additional, fewer, or alternative user interface components could be employed without departing from the scope of the present subject matter.

Beneficially, embodiments of the invention thus provide a board-level motor control system that integrates power conversion, protection and control devices onto a PCB structure, thereby eliminating wiring between discrete components so as to reduce cable losses, require fewer terminal connections, and eliminate voltage losses of those connections, such that a more efficient motor control system is provided. The board-level motor control system may derive control powers from input power provided by utility source and provide for management of a motor switching assembly in the system. The board-level motor control system may eliminate the need for environmentally rated housing on individual components and instead may be housed within a single compact plastic enclosure. Integration of electromechanical and/or solid-state switching devices into the board-level motor control system provides electrical isolation and enables transitioning between operational modes, with the integrated switching devices providing for flexibility in routing power to a power converter or a bypass around the power converter and transitioning between modes.

According to one embodiment of the present invention, a motor control system for selectively controlling power from a power source to a load includes at least one printed circuit board (PCB) structure and a power converter affixed to the at least one PCB structure so as to be electrically coupled therewith, the power converter operable to provide a controlled output power to the load. The motor control system also includes a standalone protection and control module mounted onto the at least one PCB structure so as to be electrically coupled therewith, the standalone protection and control module further including a front-end switching unit comprising a plurality of switching devices operable to selectively interrupt and control power flow from the power source to the power converter and to a bypass path that bypasses the power converter and a back-end switching unit positioned downstream from the front-end switching unit and comprising a plurality of switching devices operable to selectively interrupt power flow from the power converter and the bypass path to the load.

According to another embodiment of the present invention, a standalone board-level protection and control device operable with a power converter to provide a motor control system that selectively controls power from a power source to a load is provided. The board-level protection and control device includes a bypass path, a front-end switching unit positioned at a first end of the bypass path that receives power from the power source, and a back-end switching unit positioned downstream from the front-end switching unit at a second end of the bypass path. The front-end switching unit comprises a plurality of switching devices operable to selectively control power flow from the power source to the power converter and to the bypass path. The back-end switching unit comprises a plurality of switching devices operable to selectively control power flow from the power converter and the bypass path to the load. The front-end switching unit, the back-end switching unit, and the bypass path provide bypass functionality and short circuit protection to the power converter when operated therewith.

The present invention has been described in terms of the preferred embodiment, and it is recognized that equivalents, alternatives, and modifications, aside from those expressly stated, are possible and within the scope of the appending claims.

What is claimed is:

1. A motor control system comprising:
  a printed circuit board (PCB) structure comprising one or more electrically conductive traces;
  a power converter mounted onto the PCB structure, the power converter operable to provide a controlled output power to a load; and
  a protection and control module mounted onto the PCB structure, the protection and control module comprising:
    a front-end switching unit comprising a plurality of switching devices operable to selectively interrupt and control power flow from a power source to the power converter and to a bypass path that bypasses the power converter, wherein the plurality of switching devices comprises: a solid-state switching device comprising a plurality of solid-state switches that are selectively switchable to control and condition power flow therethrough, and an electromechanical switching device positioned downstream from the solid-state switching device and comprising a plurality of isolation relays to control power flow to the power converter and the bypass path; and
    a back-end switching unit positioned downstream from the front-end switching unit and comprising a plurality of switching devices operable to selectively interrupt power flow from the power converter and the bypass path to the load,
wherein at least one of the one or more electrically conductive traces is configured to provide an electrical path between the power converter and the protection and control module.

2. The motor control system of claim 1 wherein the protection and control module comprises a plug-and-play device that clips onto or plugs into the PCB structure to mount the protection and control module onto the PCB structure.

3. The motor control system of claim 1 wherein the protection and control module is operable in a power conversion mode and a bypass mode;
wherein, when operating in the power conversion mode, the plurality of switching devices in the front-end switching unit are controlled to allow power flow from the power source to the power converter and block power flow to the bypass path, and the plurality of switching devices in the back-end switching unit are controlled to direct power flow that is output from the power converter to the load and block power flow from the bypass path to the load; and
wherein, when operating in bypass mode, the plurality of switching devices in the front-end switching unit are controlled to block power flow from the power source to the power converter and allow power flow to the bypass path, and the plurality of switching devices in the back-end switching unit are controlled to isolate the load from the power converter and allow power flow from the bypass path to the load.

4. The motor control system of claim 1 wherein the protection and control module further comprises a controller configured to control operation of the plurality of switching devices in each of the front-end switching unit and the back-end switching unit to switch the plurality of switching devices between On and Off states, so as to selectively route power to the power converter and the bypass path.

5. The motor control system of claim 4 wherein the protection and control module further comprises a module input/output (I/O) and communications interface operatively coupled to the controller, the module I/O and communications interface configured to receive inputs on operating parameters of the motor control system and provide the inputs to the controller.

6. The motor control system of claim 1 wherein the protection and control module further comprises a system power supply that receives power from the power source and provide power for operation of the front-end switching unit, the back-end switching unit, and the power converter.

7. The motor control system of claim 1 wherein the back-end switching unit comprises a pair of load isolation relays on each phase to selectively conduct and block current therethrough in order to control power provided to the load, the pair of load isolation relays comprising:
a first load isolation relay selectively controlled between an Off/open position that blocks current therethrough and an On/closed position that conducts current therethrough that is output from the power converter; and
a second load isolation relay selectively controlled between an Off/open position that blocks current therethrough and an On/closed position that conducts current therethrough that is flowing on the bypass path.

8. The motor control system of claim 1 wherein the back-end switching unit comprises a load isolation single pole double throw (SPDT) relay on each phase that selectively conducts and blocks current therethrough in order to control power provided to the load, each load isolation SPDT relay having:
an Off/open position that blocks current through the load isolation SPDT relay;
a first On/closed position that conducts current through the load isolation SPDT relay that is output from the power converter; and
a second On/closed position that conducts current through the load isolation SPDT relay that is flowing from the bypass path.

9. The motor control system of claim 1 further comprising at least one of over current and surge protection devices and filters separate from or integrated with the protection and control module and positioned upstream from the front-end switching unit.

10. The motor control system of claim 1 wherein the PCB structure comprises a plurality of PCB boards.

11. The motor control system of claim 10 wherein the power converter is mounted onto a first one of the PCB boards, and the protection and control module is mounted onto a second one of the PCB boards.

12. A board-level protection and control device operable with a power converter to provide a motor control system that selectively controls power from a power source to a load, the board-level protection and control device comprising:
a bypass path;
a front-end switching unit positioned at a first end of the bypass path and that receives power from the power source, the front-end switching unit comprising a plurality of switching devices operable to selectively control power flow from the power source to the power converter and to the bypass path, wherein the plurality of switching devices comprises: a solid-state switching device comprising a plurality of solid-state switches that are selectively switchable to control and condition power flow therethrough, and an electromechanical switching device positioned downstream from the solid-state switching device and comprising a plurality of isolation relays that are selectively opened and closed to interrupt and direct power flow to the power converter and the bypass path; and
a back-end switching unit positioned downstream from the front-end switching unit at a second end of the bypass path, the back-end switching unit comprising a plurality of switching devices operable to selectively control power flow from the power converter and the bypass path to the load;
wherein the front-end switching unit, the back-end switching unit, and the bypass path provide bypass functionality and short circuit protection to the power converter when operated therewith.

13. The board-level protection and control device of claim 12 further comprising a plug-and-play type connection couplable with a corresponding connection on a printed circuit board (PCB) structure to which the board-level protection and control device is mounted.

14. The board-level protection and control device of claim 12 further comprising a controller operably connected to the front-end switching unit and the back-end switching unit to control operation of the plurality of switching devices therein, the controller programmed to:
receive an input comprising one of more of an operational status of the power converter and a desired operating condition of the load;

determine a desired operating condition of the motor control system based on the received input, the desired operating condition comprising one of a power conversion mode and a bypass mode; and controlling operation of the plurality of switching devices in each of the front-end switching unit and the back-end switching unit, so as to cause the motor control system to operate in one of the power conversion mode and the bypass mode.

15. The board-level protection and control device of claim 14 wherein the controller is programmed to communicate with the power converter through communication protocols using configurable lite logic, so as to allow the board-level protection and control device to receive inputs from the power converter and provide inputs to the power converter.

16. The board-level protection and control device of claim 12 wherein the plurality of solid-state switches is selectively operable in an On/closed state to conduct current therethrough, an Off/open state to block current therethrough, or selectively switched On/Off to control transmission of voltage and current therethrough and thereby limit transient voltages and current to the load, so as to allow for a soft ramp-up of the load.

17. The board-level protection and control device of claim 12 wherein the back-end switching unit comprises a plurality of load isolation relays operable to selectively conduct and block current therethrough in order to control power provided to the load either from the power converter or from the bypass path.

18. An apparatus comprising:
  a printed circuit board (PCB) structure comprising a plurality of electrically conductive traces;
  a bypass path comprising at least a first one of the plurality of electrically conductive traces;
  a converter path comprising at least a second one of the plurality of electrically conductive traces;
  a front-end switching unit positioned at a first end of the bypass path and at a first end of the converter path, the front-end switching unit configured to control power flow from a power source to the first converter path and to the bypass path; and
  a back-end switching unit positioned at a second end of the bypass path and at a second end of the converter path, the back-end switching unit configured to control power flow from the converter path and the bypass path to a load;
  wherein, the front-end switching unit comprises: a solid-state switching device comprising a plurality of solid-state switches; and an electromechanical switching device positioned downstream from the solid-state switching device and comprising a plurality of isolation relays, and in operational use of the apparatus, the converter path is electrically connected to a power converter, and the bypass path bypasses the power converter.

19. The apparatus of claim 18, further comprising a controller coupled to the front-end switching unit and the back-end switching unit, wherein the controller is configured to control the front-end switching unit and the back-end switching unit to place the apparatus in one of a bypass mode and a power conversion mode.

20. A motor control system for selectively controlling power from a power source to a load, the motor control system comprising:
  at least one printed circuit board (PCB) structure;
  a power converter affixed to the at least one PCB structure so as to be electrically coupled therewith, the power converter operable to provide a controlled output power to the load; and
  a standalone protection and control module mounted onto the at least one PCB structure so as to be electrically coupled therewith, the standalone protection and control module comprising:
    a front-end switching unit comprising a plurality of switching devices operable to selectively interrupt and control power flow from the power source to the power converter and to a bypass path that bypasses the power converter; and
    a back-end switching unit positioned downstream from the front-end switching unit and comprising a plurality of switching devices operable to selectively interrupt power flow from the power converter and the bypass path to the load; and
    wherein the standalone protection and control module is operable in a power conversion mode and a bypass mode;
    wherein, when operating in the power conversion mode, the plurality of switching devices in the front-end switching unit are controlled to allow power flow from the power source to the power converter and block power flow to the bypass path, and the plurality of switching devices in the back-end switching unit are controlled to direct power flow that is output from the power converter to the load and block power flow from the bypass path to the load; and
    wherein, when operating in bypass mode, the plurality of switching devices in the front-end switching unit are controlled to block power flow from the power source to the power converter and allow power flow to the bypass path, and the plurality of switching devices in the back-end switching unit are controlled to isolate the load from the power converter and allow power flow from the bypass path to the load.

21. The motor control system of claim 20 wherein the front-end switching unit comprises:
  a solid-state switching device comprising a plurality of solid-state switches that are selectively switchable to control and condition power flow therethrough; and
  an electromechanical switching device positioned downstream from the solid-state switching device and comprising a plurality of isolation relays to control power flow to the power converter and the bypass path.

22. The motor control system of claim 21 wherein the plurality of isolation relays comprises a single pole double throw (SPDT) relay on each phase, each SPDT relay having:
  an Off/open position that blocks current through the SPDT relay;
  a first On/closed position that conducts current through the SPDT relay and directs the current to the power converter; and
  a second On/closed position that conducts current through the SPDT relay and directs the current to the bypass path.

23. The motor control system of claim 21 wherein the plurality of isolation relays comprises a pair of isolation relays on each phase, the pair of isolation relays comprising:
  a first isolation relay selectively controlled between an Off/open position that blocks current therethrough and an On/closed position that conducts current therethrough and directs the current to the power converter; and a second isolation relay selectively controlled between an Off/open position that blocks current therethrough and an On/closed position that conducts current therethrough and directs the current to the bypass path.

24. The motor control system of claim 21 wherein the plurality of solid-state switches is selectively operable in an On/closed state to conduct current therethrough, an Off/open state to block current therethrough, or selectively switched On/Off to control transmission of voltage and current therethrough and thereby limit transient voltages and current to the load, so as to allow for a soft ramp-up of the load.

25. A motor control system comprising:
a printed circuit board (PCB) structure comprising one or more electrically conductive traces;
a power converter mounted onto the PCB structure, the power converter operable to provide a controlled output power to a load; and
a protection and control module mounted onto the PCB structure, the protection and control module comprising:
   a front-end switching unit comprising a plurality of switching devices operable to selectively interrupt and control power flow from a power source to the power converter and to a bypass path that bypasses the power converter; and
   a back-end switching unit positioned downstream from the front-end switching unit and comprising a plurality of switching devices operable to selectively interrupt power flow from the power converter and the bypass path to the load, wherein the back-end switching unit comprises:
     a load isolation single pole double throw (SPDT) relay on each phase that selectively conducts and blocks current therethrough in order to control power provided to the load, each load isolation SPDT relay having: an Off/open position that blocks current through the load isolation SPDT relay; a first On/closed position that conducts current through the load isolation SPDT relay that is output from the power converter; and a second On/closed position that conducts current through the load isolation SPDT relay that is flowing from the bypass path, and
wherein at least one of the one or more electrically conductive traces is configured to provide an electrical path between the power converter and the protection and control module.

* * * * *